2 Sheets—Sheet 1.

C. E. PATRIC.

SEEDING-MACHINES.

No. 7,875. Reissued Sept. 4, 1877.

Witnesses:

C. Clarence Poole

Augt. S. Sondam

Inventor:

C. E. Patric

N. PETERS, PHOTO-LITHOGRAPHER, WASHINGTON, D. C.

2 Sheets—Sheet 2.

C. E. PATRIC.

SEEDING-MACHINES.

No. 7,875. Reissued Sept. 4, 1877.

Attest:

C. Clarence Poyle

Wm. L. Jordan

Inventor:

C. E. Patric.

N. PETERS, PHOTO-LITHOGRAPHER, WASHINGTON, D. C.

UNITED STATES PATENT OFFICE.

CHARLES E. PATRIC, OF SPRINGFIELD, OHIO.

IMPROVEMENT IN SEEDING-MACHINES.

Specification forming part of Letters Patent No. 159,210, dated January 26, 1875; Reissue No. 7,875, dated September 4, 1877; application filed March 2, 1877.

*To all whom it may concern:*

Be it known that I, CHARLES E. PATRIC, of Springfield, county of Clarke, State of Ohio, have invented certain new and useful Improvements in Seeding-Machines, of which the following is a full, clear, and exact description, reference being had to the accompanying drawing, making part of this specification, in which—

Figure 1:
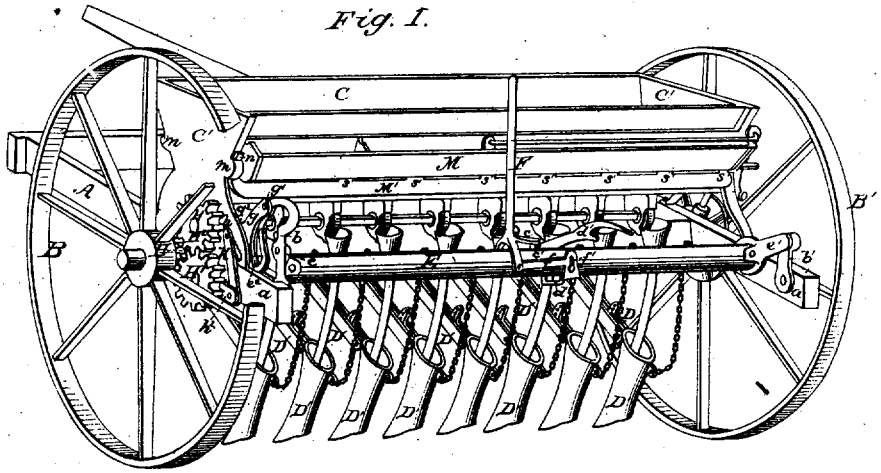
Figure 2:
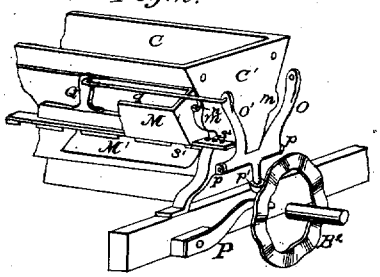
Figure 3:
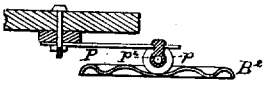
Figure 5:
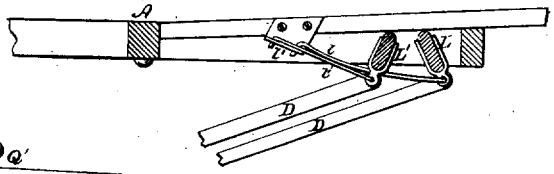
Figure 4:
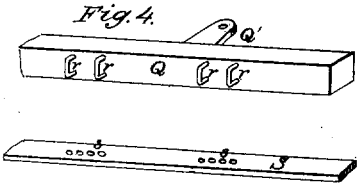
Figure 6:
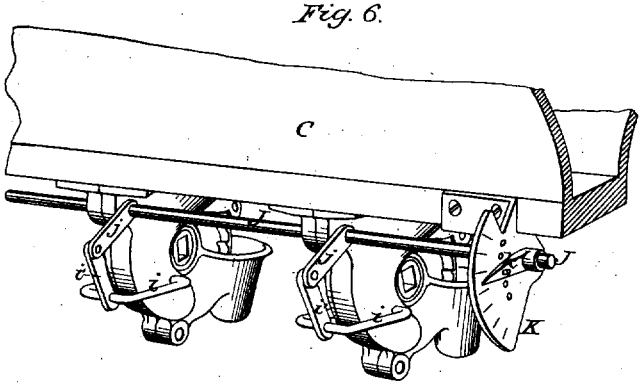
Figure 7:
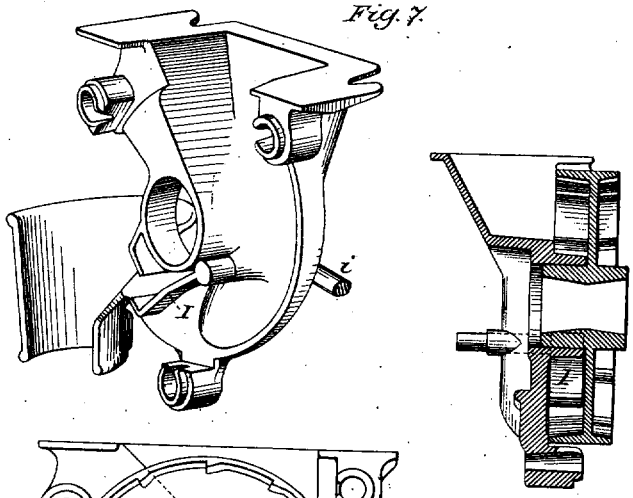
Figure 8:
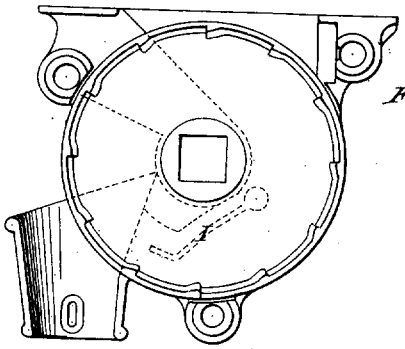

Figure 1 is a perspective view of a seeding-machine embracing my improvements. Fig. 2 is a similar view of a portion of the same, taken from the opposite side, and showing the mechanism for operating the grass-seed slide. Fig. 3 is a plan or top view of the cam and spring for actuating this grass-seed slide or agitator. Fig. 4 is a perspective view of the agitator-slide, and also of the adjustable hopper-bottom slide. Fig. 5 is a side elevation of the devices for adjusting the hoes or drill-teeth. Fig. 6 is a perspective view, showing the devices for adjusting and indicating the quantity of seed sown to the acre. Fig. 7 is a perspective view of one of the distributer-wheel casing-plates, showing the adjustable plate by which the quantity of seed sown to the acre is regulated; and Fig. 8 is a side elevation of one of the distributing-wheels in its place, relative to one of the casing-wheels, and showing the adjustable channel-plate in dotted lines behind said wheel.

Similar letters of reference indicate similar parts wherever used.

The invention relates more particularly to that class of seeding-machines employing vertical distributing-wheels, so called, from the fact that the vertical side or sides of a series of disks or wheels revolving on a horizontal shaft are made available for conveying the grain from the grain box or hopper to the conducting or discharging tubes.

The general construction of these machines being well understood, description in detail need only be made of such parts as will enable others skilled in the manufacture to understand and apply my improvements.

The invention consists, first, in a novel construction of the lifting-lever, which is provided with a tripper for lifting the pawl which engages with and holds the lifting-roller when the drill teeth or hoes are raised for transportation or for passing an obstruction, whereby the operator is enabled to control the hoes with one hand, while the other is left free to guide the team.

The invention further consists in combining the devices which throw the feed into and out of action with the eccentric lifting roller-arms, in such manner that as the hoes are lifted out of the ground the feed will be arrested, and vice versa, as hereinafter explained.

The invention further consists in combining with a grass-seed hopper which is changeable from front to rear, and vice versa, suitable devices for agitating and effecting the discharge of the grass-seed in either position of the grass-seed hopper; also, in certain details of construction of the grass-seed attachment, as hereinafter fully set forth.

It is highly desirable that the feed should be variable at the pleasure of the operator, so that the machine may be caused to deposit a greater or less quantity per acre, as may be required, and also to adapt the machine to the various kinds of large and small grain with which it may be employed; and heretofore the feed has been regulated either by varying the speed of the feed-wheel, or by means of cut-off devices, operating from the outside through the walls of the case.

Effective operation depends upon the maintenance of a certain uniform speed, and a variable speed will produce a variable delivery also, because the slower the speed the less will be the power to move the grain, and vice versa. Difference of speed will also affect grains of different sizes or texture.

My invention remedies the difficulties above named by securing a variable capacity of the seed-passage independent of the speed or of the continuity of the walls of the case, and a uniform speed of feed-wheel independent of the capacity of the seed-passage. It, therefore, also consists in a movable gate or valve placed within the seed-channel of a vertical feed-wheel, and adjusted by rotation of its pivotal shaft, which causes the face end of said gate to approach or recede from the peripheral flange, and thus control at will the size of the seed-passage and the quantity of seed delivered.

There are several feed-wheels attached, and simultaneously operated, upon the same shaft, and it is desirable that the regulating devices of all the several seed-wheels should be simultaneously adjusted, and in exact accordance with each other.

I am aware that this has been done in feed devices having an endwise or sliding adjustment by means of a sliding-gate rod; but a device of that character is not applicable to pivoted adjusting-gates operating within the channels of the seed-wheels; and my invention, therefore, also consists in connecting the axes of my several seed-gates with a single adjusting rock-shaft, which is also provided with a device for holding the same in any desired position, and an index, whereby the desired adjustment may be indicated and determined.

In the accompanying drawing, A represents a rectangular main frame; B $B^1$, the driving and carrying wheels; C, the grain box or hopper; D, the drag-bars; and D′, the drill-teeth or hoes, all of any usual or preferred construction. The projecting rear ends *a a* of the longitudinal frame-bars have standards *b b′* secured to them, in each of which is pivoted an eccentric or crank arm, *e* $e^1$, each provided on the inner face of its outer swinging end with a socket for the reception of the ends of the lifting-roller E, which extends transversely across the rear of the frame between said arms *e* $e^1$. The hoes or drill-teeth D′ are connected with this roller E by chains extending upward in front of the roller, and adapted to be rolled up thereon for lifting the teeth by the backward rotation of said roller. The roller E, about midway of its length, has a lever, F, pivoted to it, the lower end of the lever being forked to clasp the roller, and the pivot connecting it therewith passing through the roller and through the lower end of the fork. The rear arm of the fork has a horizontal arm, *f*, formed upon or connecting with it, the outer end of said arm being expanded in width at *f′* to form a tripper-foot, slotted vertically in the arc of a circle of which the lever-pivot is the center, and held in place by a pin or spur passing through the slot into the roller, said pin serving as a stop to limit the throw of the tripper-foot.

The lever F has a second horizontal arm, *c*, which extends out in line about parallel with the roller, and between the outer end of which and the roller E is placed a spring, *c′*, which serves to hold the arm away from the roller as far as the stop to tripper-foot *f′* will permit. The roller is provided with a staple or ratchet-tooth, *d*, which, when the teeth are raised, engages with a pawl, *d′*, pivoted to the frame or grain-box, said pawl serving to hold the teeth in their elevated position. The lever, when the teeth are thus raised, has been moved backward until the tripper *f′* is brought in front of the roller and rests directly under the pawl or latch *d*, in such position that the attendant, by grasping the lever F and vibrating it on its pivot, overcoming the tension of the spring *c′*, can throw the tripper up and release the pawl, when lifting-roller can be rotated for allowing the teeth to descend into the ground.

The standard *b*, at one end of the lifting-roller, is made in the form of an open quadrant, and a pin, $e^2$, on the swinging end of the crank or eccentric arm *e*, extends through the open quadrant and engages with a swinging hook-plate, *g*, pivoted at its upper end to the standard *b* at $g^1$, the pin $e^2$ working in an eccentric slot in said plate, and giving a backward and forward vibration to said plate at the beginning of the upward movement of the lifting-roller and arm *e*, and near the end of their downward throw. The rear face of this hook-plate has an arm or lug, $g^2$, provided with a horizontal pin or stud, which passes through an inclined or curved slot at *h* in the foot of the grain-box end or standard, and has connected to it the upper end of a link, $h^1$, which, at its lower end, is connected with the rear swinging end of a pivoted lever-arm, $h^2$, which supports the intermediate gear $H^1$, through which motion is transmitted from the driving-gear H on the main axle to the gear-wheel $H^2$ on the distributer-wheel shaft. The lever $h^2$ has its pivotal center coincident with the center of the wheel H, and consequently the gear $H^1$ remains always in mesh therewith; but the vibration of the hook-plate *g*, by means of the lifting roller-arm *e*, serves to raise or depress the rear end of the lever-arm, and thereby to throw the gear $H^1$ into or out of mesh with the gear $H^2$, for throwing the distributer-wheel shaft into or out of action, the relation and movement of the parts being such that the distributing-wheel shaft is thrown out of gear whenever the drill-teeth are lifted out of the ground, and in gear when said teeth are in working position.

For varying the quantity of seed to be sown to any given quantity of ground, I provide the measuring-channel, formed between the vertical distributing-wheel and its casing, with an adjustable gate or throat-piece, I, (see Fig. 7,) by means of which the size and consequent capacity of the channel may be regulated at will. This plate is pivoted at its upper forward end in the casing-plate, the pivotal shank extending through said casing, and being bent at its outer end into crank form, or provided with a crank arm or lever, *i*, the outer end of which is connected by a link, *i′*, with an arm, *j*, on a rock-shaft, J, those on the opposite sides of the same wheel being connected with a single arm, *j*, and all of the adjusting-plates of the several distributing-wheels with the common rock-shaft J, as shown in Fig. 6, so that all may be adjusted together, and a uniform adjustment effected.

The casing of the distributer-wheel I is enlarged immediately in front of the pivot-shank of said plate, so that the said casing constitutes a kind of funnel or reservoir, into which the grain descends to supply the seed-wheel, close to the point of delivery. The gate I forms an abutment, against which the grain rests, and the distance of the free end of said gate from the peripheral flange determines the quantity of seed which may escape. By rotation of said gate on its axis said distance is increased or diminished at pleasure.

The free end of the plate I is bent upward, for the purpose of preventing seed from falling or running back upon the upper side of said gate so as to obstruct the opening of the gate.

As it is necessary to measure minute variations of the positions of the free end of the gate I, the levers *i* and *j* are made longer than said gate, so that they traverse larger arcs, and therefore are more easily measured.

As shown in Fig. 7, the spindle or axis of the valve projects through the case, and the arm *i* may be attached thereto in any proper and well-known way.

The dial K is connected to the frame or hopper-bottom; and an index, *k*, on shaft J, which may be held at any desired point by a pin on the index, or by a bolt passing through a slot in the plate K, and held by a thumb-nut, will serve to indicate and determine the quantity passing through the several measuring-channels in traveling any given distance.

The means for changing the position of the hoes from a single transverse line to a double row or zigzag position are shown in Fig. 5, in which D indicates the drag-bars, pivoted at their forward ends to the lower vibrating edge of eccentric rocking bars L L′ alternately. These bars are pivoted near their upper edges in the longitudinal frame-bars, and are held with their lower edges brought together for bringing the hoes into the same line, or separated for zigzagging them, as desired, by means of hook-traces *l*, secured at the required point in a perforated plate, *l′*, in such manner that by simply removing the hook from one hole in said plate and placing it in another the desired adjustment can be effected.

For convenience in adjusting the grass seed attachment, for the purpose of effecting a delivery of the seed either in front or in rear of the drill-teeth D, as the condition of the ground may require, the metallic hopper ends C′ are provided, on both their front and rear edges, with grooved ears or flanges *m*, and the metallic ends of the grass-seed hopper with spurs *n*, which fit in said grooves, and serve to hold the grass-seed hopper M either at the front or rear of the grain-box by simply turning said hopper M end for end. An inclined scattering-plate, M′, serves to throw the seed well in front or in rear of the hoes, as the case may be.

For actuating the grass-seed agitator-slide in either position a forked vibrating lever, O, is pivoted in lugs *p* in the outer face of the hopper-end plate, one arm, *o*, of the fork extending up in front, and the other, *o′*, in rear, of the hopper, in such position that one or the other may be used, according as the grass-seed hopper is in front or in rear. The lower arm of this lever carries a friction-roller, $p^1$, and has a lateral vibration imparted to it by means of a wave-cam, $B^2$, connected with the wheel $B^1$ upon the one side, and a spring, P, on the other.

A plan view of a slight modification of these parts is shown in Fig. 3, in which the lower arm of the lever carrying the friction-roller *p* has connected with it one end of a link, $p^2$, which, at its opposite end, is pivoted to the spring P, in such manner as to form a toggle-link connection therewith, for compensating for the shortening of the spring consequent upon its vibration, and permitting the lateral vibration of the roller in right line. By this arrangement a reciprocating movement is imparted to the grass-seed slide Q through a link, *q*, which connects it with the lever O, the head Q′, or point of connection of the link with the slide, being midway of the length of the slide, so that the same connecting-rod may be used either in front or in rear.

The agitator-slide Q is armed on its lower face with stirrers *r*, made in staple or stirrup form, (see Fig. 4,) placed in pairs, as shown, these staples being arranged so as to vibrate back and forth over the perforations *s* in the grass-seed hopper-bottom slide, through which the grass-seed is discharged. The seed can readily pass through and around these stirrers, which rest upon the bottom slide S, and serve to keep the perforations free from obstruction.

The hopper-bottom S′, underneath the bottom slide S, is provided with openings $s^1$, through which the seed escapes, falling upon the inclined scattering-board M′, from which it is delivered upon the ground. The perforations *s* are formed in series of four or five, more or less, the distance between those of one series and those of another corresponding with the distance between the outlet-openings $s^1$ in the bottom S′; and, the slide S being made movable lengthwise, one, two, or more of the perforations *s* may be used to discharge the seed in such manner as to regulate the quantity sown to the acre. Thus, if the slide is so adjusted that the seed is discharged through one perforation of each series, about two quarts will be sown to the acre, and if two of each series are opened four quarts will be sown per acre, and so on.

The end of the slide S projecting beyond the hopper is provided with a series of perforations, $s^2$, for indicating the position of the perforations in the several series *s*, so arranged that if one of the perforations is exposed to view the seed will be discharged through one of each of the series *s*—the number in use in each series indicated by the number thus exposed at the end of the hopper.

Some of the advantages derived from the improvement above described may be stated as follows, viz: By the pivoting of the eccentric arms of the lifting-roller in rear of said roller, so as to require a backward thrust to the lifting-lever, instead of the upward and forward lift usually employed for lifting the hoes out of the ground, the lifting-lever is in the best position for the operator to exert his strength where the greatest power is required; the gear-shifting mechanism is brought into more compact form; and the lifting-chains, being in front of the roller, are better adapted to accommodate the changes in the position of the hoes, obviating the necessity of adjusting the length of the chains when the hoes are changed from a single to a double row, or vice versa. These, with other advantages, will, however, be readily understood and appreciated by those familiar with what is required of this class of machines.

Having described my invention, what I claim as new is—

1. The lifting-roller lever F, provided with the tripper-foot, in combination with a latch or pawl, $d'$, arranged and operating substantially as described.

2. The eccentric lifting-roller arm $e$, in combination with the pivoted cam-hook $g$, for throwing the shaft of the distributer-wheel into or out of action, substantially as and for the purpose set forth.

3. The pivoted cam-hook $g$ and link $h^1$, in combination with the lever $h^2$, to which the intermediate transmitting gear-wheel $H^1$ is secured, arranged and operating substantially as described.

4. The lifting-roller E, connected with the eccentric arms $e$ $e^1$ in advance of their pivotal center, whereby a backward thrust is given to the lifting-lever in raising the drill-teeth, substantially as and for the purpose set forth.

5. The forked lever O, in combination with the changeable grass-seed hopper, for actuating the slide of the grass-seed agitator, either in front or rear of the grain-box, as described.

6. The stirrers $r$, made in staple or stirrup form, and combined in pairs with the reciprocating slide of the agitator, as described.

7. The slide S, provided with the series of perforations $s$ for discharging the grass-seed, and with the indicator-perforations $s$ arranged outside of the hopper, in the manner and for the purpose described.

8. The eccentrically-pivoted bars L L′, to which the drag-bars D are connected, in combination with the hook-braces $l$ and perforated retaining-plate $l'$, substantially as and for the purpose described.

9. A vertically-revolving feed-wheel, having a continuous seed-channel within its rim, combined with a gate or valve located within said seed-channel, and adjustable toward or away from the flanged periphery of said wheel for varying the capacity of said seed-channel, said valve being mounted upon a pivotal axis parallel with the axis of said distributer, for the purpose set forth.

10. A vertically-revolving feed-wheel, having a continuous seed-channel within its rim, and an adjustable valve or gate located within said seed-channel, and mounted upon a pivotal axis parallel with the axis of said feed-wheel, combined with a crank-arm, $i$, attached to said pivot, whereby said gate may be moved for adjustment to vary the capacity of said seed-channel.

11. A vertically-revolving feed-wheel, having a continuous seed-channel within its rim, combined with a gate or valve, I, within said seed-channel, and moving upon a pivotal axis, also, within the rim of said wheel, said gate being adjustable toward or away from the periphery of said wheel, to vary the size and capacity of said channel.

12. In a seeding-machine, a series of seed-distributers, each having a vertical revolving feed-wheel with a continuous seed-channel within its rim, and within said seed-channel a gate or valve, adjustable in the plane of the wheel's rotation upon an axis which is parallel with the axis of said wheel, and all the gates or valves of said series adapted to be operated by, and combined with, a single rock-shaft, whereby the simultaneous adjustment of said valves may be effected.

13. In a seeding-machine, a series of seed-distributers, each having a vertical revolving feed-wheel with a continuous seed-channel within its rim, and within said seed-channel a gate or valve, adjustable in the plane of the wheel's rotation upon an axis which is parallel with the axis of said wheel, and all the gates or valves of said series adapted to be operated by a single rock-shaft, combined with an index and dial, to indicate the quantity of seed to be discharged according to the adjustment of said valves.

C. E. PATRIC.

Witnesses:
WM. W. RICE,
J. H. MELLINGER.